(12) United States Patent
Wu et al.

(10) Patent No.: US 7,480,224 B2
(45) Date of Patent: Jan. 20, 2009

(54) DECODING APPARATUS AND METHOD OF OPTICAL INFORMATION REPRODUCING SYSTEM

(75) Inventors: Wen-Yi Wu, Jhubei (TW); Meng-Ta Yang, Jhunan Township, Miaoli County (TW)

(73) Assignee: MediaTek Inc. (TW)

( * ) Notice: Subject to any disclaimer, the term of this patent is extended or adjusted under 35 U.S.C. 154(b) by 706 days.

(21) Appl. No.: 11/212,084

(22) Filed: Aug. 24, 2005

(65) Prior Publication Data

US 2006/0050814 A1    Mar. 9, 2006

(30) Foreign Application Priority Data

Sep. 3, 2004    (TW) ............................... 93126592 A

(51) Int. Cl.
*G11B 7/00* (2006.01)
(52) U.S. Cl. ............... 369/59.22; 369/53.35; 369/47.18
(58) Field of Classification Search ............. 369/59.22, 369/59.21, 47.35, 53.35, 47.18, 124.1, 124.01
See application file for complete search history.

(56) References Cited

U.S. PATENT DOCUMENTS

| | | | |
|---|---|---|---|
| 5,588,011 A | 12/1996 | Riggle | |
| 5,661,709 A | 8/1997 | Takagi et al. | |
| 6,222,808 B1 | 4/2001 | Kagawa | |
| 6,289,059 B1 | 9/2001 | Yamaguchi et al. | |
| 6,307,822 B1 * | 10/2001 | Shim et al. | 369/47.18 |
| 6,570,940 B2 | 5/2003 | Yamaguchi et al. | |

OTHER PUBLICATIONS

Naoki Ide; Adaptive Partial-Response Maximum-Likelihood Detection in Optical Recording Media; Japan Journal Applied Physics; pp. 1789-1790 (269-271); vol. 41 (2002).

* cited by examiner

*Primary Examiner*—Nabil Z Hindi
(74) *Attorney, Agent, or Firm*—Andrew D. Fortney

(57) ABSTRACT

The invention discloses a decoding apparatus and the method thereof for decoding a signal retrieved by an optical information reproducing system from an optical information recording medium. N legal codes are predetermined. According to the invention, first, the retrieved signal is converted into a data stream. Then, in a Viterbi decoding manner, the data stream is decoded into a digital code in accordance with a level of the data stream and N reference levels. Then, the binary code is decoded by a binary array into one of the N legal codes, and each of the N legal codes corresponds to one of N reference levels. In particular, the N reference levels are corrected by various detected conditions to enhance the correctness of decoded data.

22 Claims, 17 Drawing Sheets

DECODING APPARATUS AND METHOD OF OPTICAL INFORMATION REPRODUCING SYSTEM

BACKGROUND OF THE INVENTION

1. Field of the Invention

The invention relates to a decoding apparatus and the method thereof of an optical information reproducing system, and more particularly to a decoding apparatus and the method thereof utilizing Viterbi decoding.

2. Description of the Prior Art

Referring to FIG. 1, FIG. 1 is a schematic diagram illustrating a decoding apparatus 10 of a conventional optical information reproducing system (e.g. CD-ROM drive). The decoding apparatus 10 includes an equalizer 12, a Viterbi decoder 14, a demultiplexer 16, a binary array 18, a delay 20, and a reference level generating device 22.

The equalizer 12 is used for receiving a radio frequency signal $F_{RF}$ and outputting an equalization signal $F_{eq}$ with respect to the signal $F_{RF}$, wherein the signal $F_{RF}$ is related to a pickup head (not shown) retrieving a data (not shown) from an optical information recording medium (not shown), e.g. compact disc. According to a reference level RL, the Viterbi decoder 14 decodes the equalization signal $F_{eq}$ to a digital signal $F_{bi}$ and outputs the digital signal $F_{bi}$. The binary array 18 is used for receiving the feedback of the digital signal $F_{bi}$. The delay 20 is used for receiving the feedback of the equalization signal $F_{eq}$. The demultiplexer 16 is used for respectively receiving the outputs from the binary array 18 and the delay 20, and, according to the output of the binary array 18, selectively inputting the output of the delay 20 into a corresponding low-pass filter 222 of the reference level generating device 22. Afterward, the reference level generating device 22 will generate the reference level RL.

In the decoding apparatus 10 of the conventional optical information reproducing system, once the optical information recording medium (e.g. CD) is damaged, such as scratch, finger print, etc. The data stored in the damaged area and read by the pickup head are incorrect data. Accordingly, the reference level generating apparatus 22 will generate an incorrect reference level RL, so that the Viterbi decoder 14 will decode the data to incorrect information.

Moreover, in the decoding apparatus 10 of the conventional optical information reproducing system, N calculators are needed to calculate N reference levels. In other words, it had not been seen in the prior art about that sharing less than N calculators to calculate N reference levels.

SUMMARY OF THE INVENTION

An objective of the invention is to provide a decoding apparatus and the method thereof for an optical information reproducing system, so as to solve the above-mentioned problems.

Another objective of the invention is to provide a decoding apparatus and the decoding method thereof for an optical information reproducing system, and in particular, the invention utilizes M calculators to calculate N reference levels, wherein N and M both are a natural number and M is less than N.

According to a preferred embodiment of the invention, the decoding apparatus is used for decoding a signal retrieved by an optical information reproducing system from an optical information recording medium. N legal codes are predetermined, wherein N is a natural number. The decoding apparatus includes an Analog-to-digital converter (ADC), an equalizer, a Viterbi decoder, a delay device, a reference level adjusting device, a conversion-speed-adjusting coefficient generating device, and at least one condition detector. The ADC is used for converting the retrieved signal into a data stream. The equalizer is coupled to an output of the ADC and used for outputting an equalized data stream corresponding to the data stream. The Viterbi decoder is coupled to an output of the equalizer and used for decoding, according to N reference levels and a level of the equalized data stream, the equalized data stream into the original data stored in the optical medium, wherein each of the N reference levels corresponds to one of the N legal codes. The binary array is used for decoding the digital data decoded by the Viterbi decoder into one of the N legal codes. The delay device is coupled to the output of the equalizer and used for delaying the equalized data stream. The reference level adjusting device is respectively coupled to an output of the binary array and an output of the delay device. The reference level adjusting device is used for receiving the code relative to the data stream and the equalized data stream corresponding to the code relative to the data stream. The reference level adjusting device is further used for adjusting the N reference levels in accordance with an algorithm including a conversion-speed-adjusting coefficient and for outputting the N reference levels to the Viterbi decoder. The conversion-speed-adjusting coefficient generating device is used for generating the conversion-speed-adjusting coefficient in response to at least one condition signal and for outputting the conversion-speed-adjusting coefficient to the reference level adjusting device. Each of the at least one condition detector is in charge of detecting a respective condition associated with the retrieved signal and outputs one of the at least one condition signal corresponding to the detected condition to the conversion-speed-adjusting coefficient generating device. Furthermore, the equalizer may be omitted in practical application, but a little performance will be sacrificed.

According to a preferred embodiment of the invention, the decoding method is used for decoding a signal retrieved by an optical information reproducing system from an optical information recording medium. N legal codes are predetermined, wherein N is a natural number. The decoding method includes the steps of: (1) converting the retrieved signal into a data stream; (2) in a Viterbi decoding manner, decoding, according to N reference levels and a level of the data stream, the data stream into the original data stored in the optical medium, wherein each of the N reference levels corresponds to one of N legal codes; (3) detecting at least one condition and outputting one of at least one condition signal corresponding to the detected condition; (4) generating a conversion-speed-adjusting coefficient in response to the outputted condition signal; and (5) feeding back the code relative to the data stream and the delayed data stream corresponding to the code of the data stream, and adjusting the N reference levels in accordance with an algorithm including the conversion-speed-adjusting coefficient.

BRIEF DESCRIPTION OF THE APPENDED DRAWINGS

DETAILED DESCRIPTION OF THE INVENTION

Figure 1:
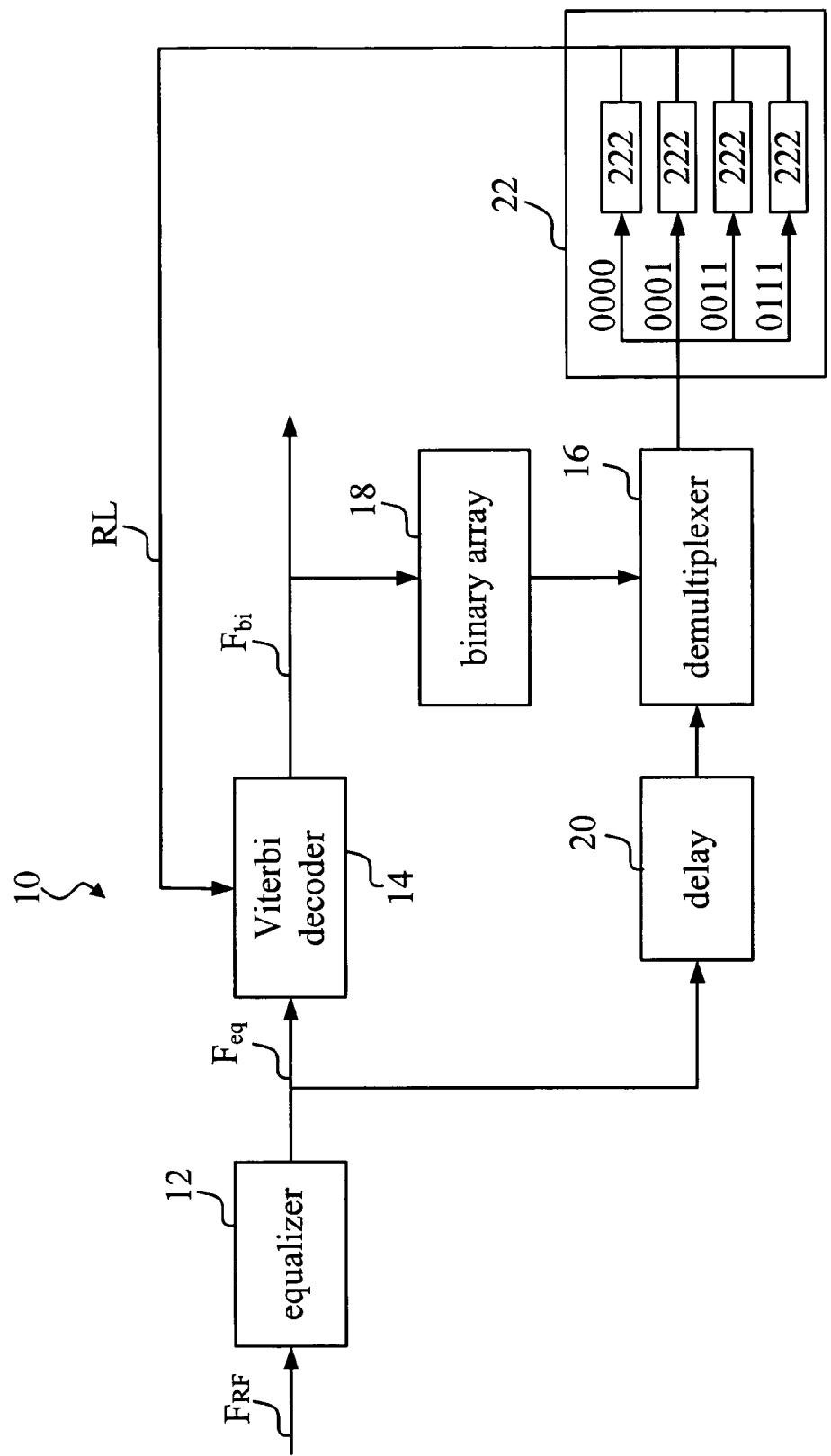
FIG. 1 is a schematic diagram illustrating a decoding apparatus of a conventional optical information reproducing system.
Figure 2:
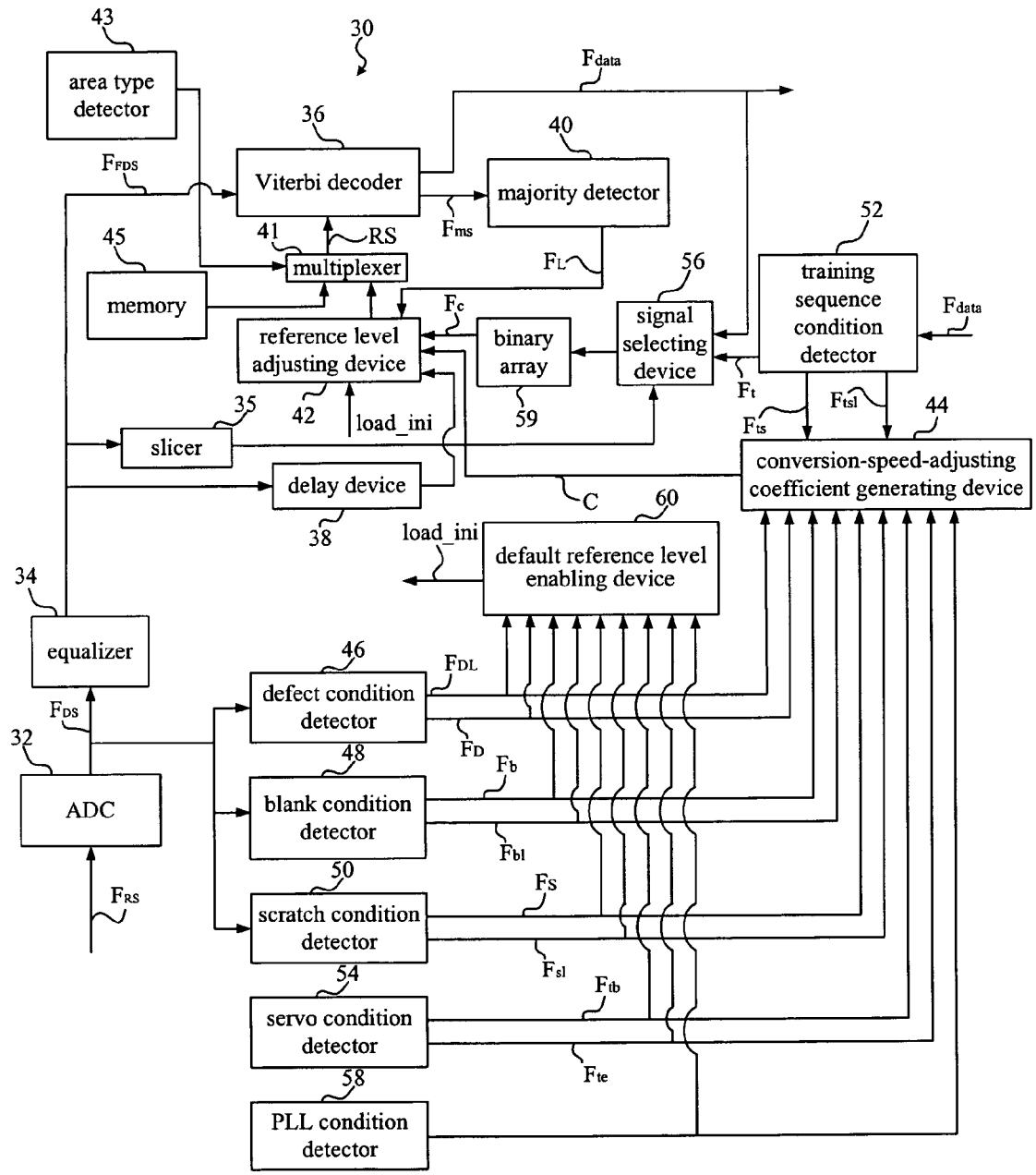
FIG. 2 is a schematic diagram illustrating a decoding apparatus according to a preferred embodiment of the invention.

Referring to FIG. 2, FIG. 2 is a schematic diagram illustrating a decoding apparatus 30 according to a preferred embodiment of the invention. The decoding apparatus 30 is used for decoding a signal $F_{RS}$ retrieved by an optical information reproducing system from an optical information recording medium.

Figure 3:
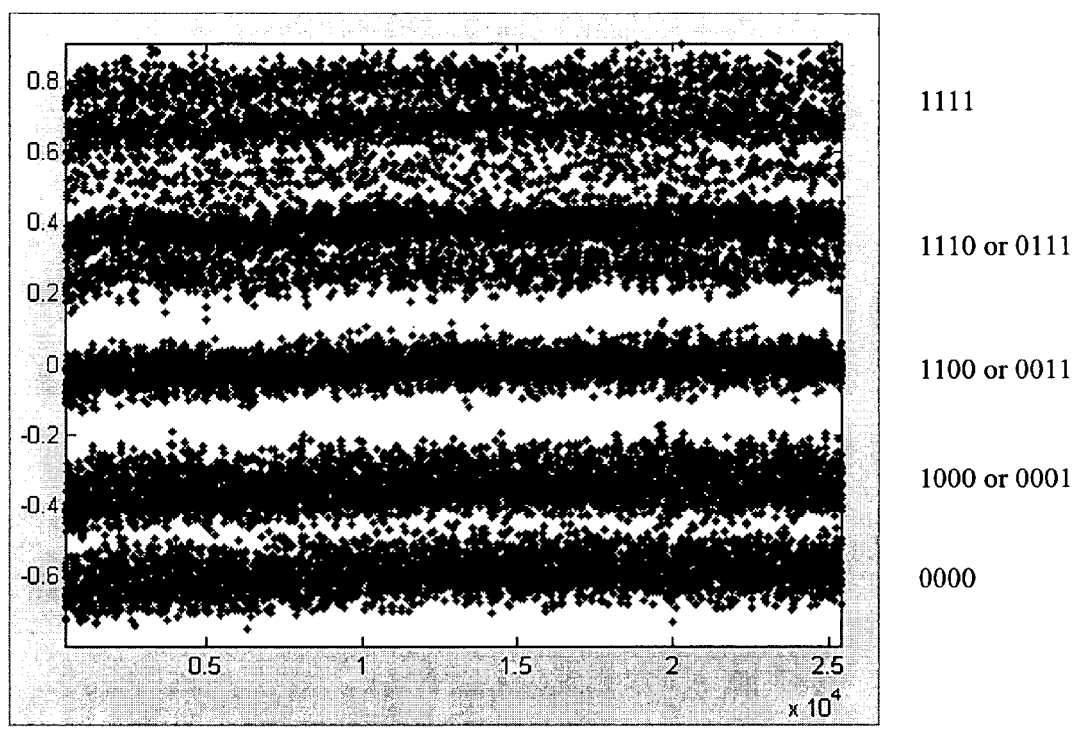
FIG. 3 is a diagram illustrating the retrieved signal $F_{RS}$ being converted into a data stream by the ADC.
Figure 4:
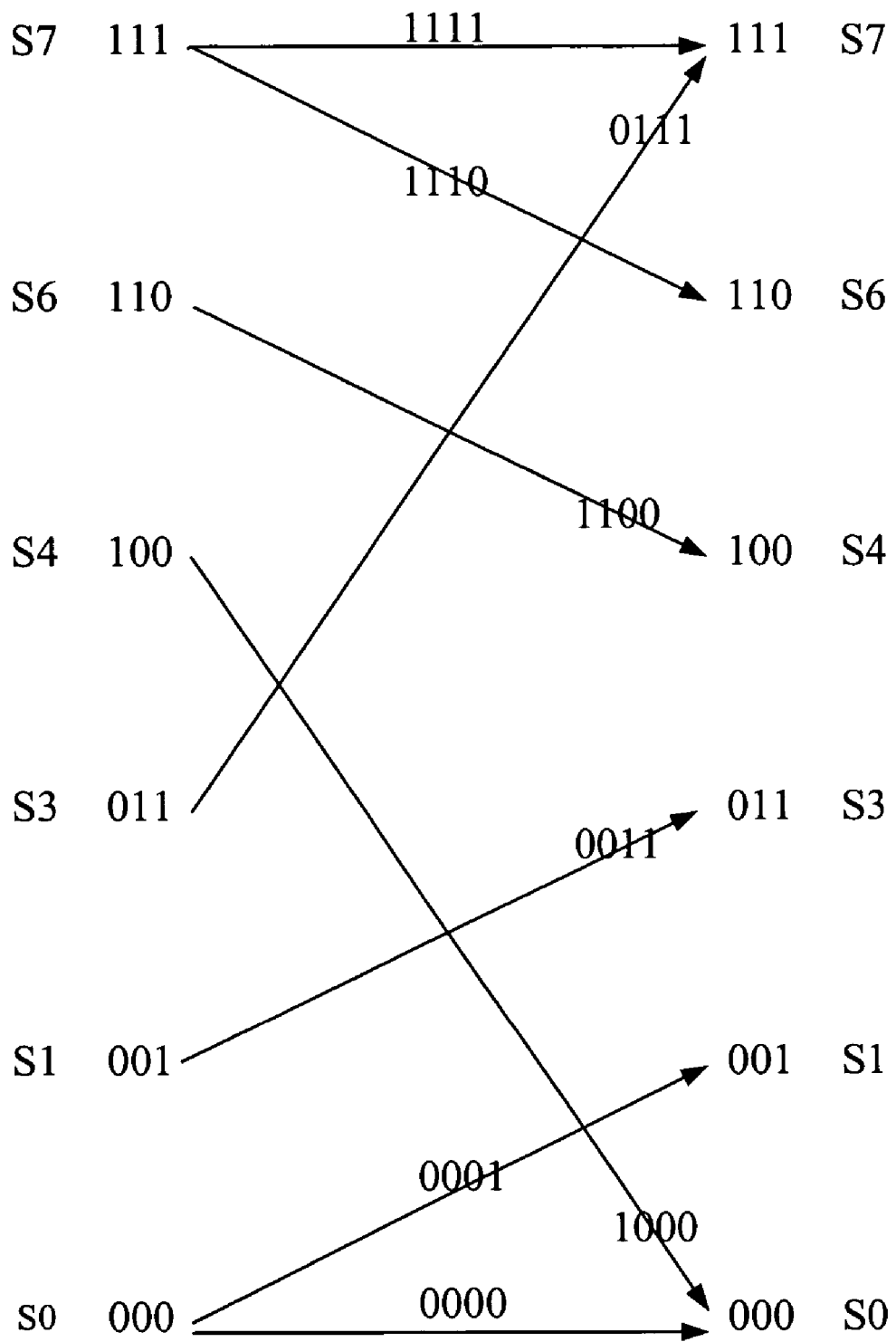
FIG. 4 is a diagram illustrating the trellis diagram of the Viterbi decoder.

As shown in FIG. 3, a signal $F_{RS}$, retrieved from the optical information recording medium, is converted into a data stream by the ADC. The reference levels of the data stream always center on some specific reference levels. Each of the reference levels corresponds to a set of legal codes. Due to the above-mentioned characteristic, the retrieved signal $F_{RS}$ can be decoded by a Viterbi decoder. As shown in FIG. 4, when the Viterbi decoder decodes the retrieved signal $F_{RS}$, each of the branches of the trellis diagram corresponds to a set of legal codes. Therefore, each of the branches of the trellis diagram also corresponds to a reference level. In practical application, the optical information reproducing system has to get a reference level of the original optical reproducing signal and then inputs the reference level into the Viterbi decoder. However, the reference level is usually influenced by scratch, finger print, and so on. Thus, Viterbi decoder will get an incorrect reference level. Therefore, the invention discloses a decoding apparatus and the method thereof for an optical information reproducing system, so as to solve the problems of the prior art.

In practical application, the above-mentioned pre-defined legal codes are not always as the above-mentioned embodiment but based on the partial response targets.

As shown in FIG. 2, the decoding apparatus 30 includes an ADC 32, an equalizer 34, a Viterbi decoder 36, a delay device 38, a majority detector 40, a reference level adjusting device 42, a conversion-speed-adjusting coefficient generating device 44, at least one condition detector, and a binary array 59.

The ADC 32 is used for converting the retrieved signal $F_{RS}$ into a data stream $F_{DS}$. The equalizer 34 is coupled to an output of the ADC 32 and used for outputting an equalized data stream $F_{FDS}$ corresponding to the data stream $F_{DS}$. The Viterbi decoder 36 is coupled to an output of the equalizer 34 and used for decoding, according to N reference levels RS and a level of the equalized data stream $F_{FDS}$, the equalized data stream $F_{DS}$. Afterward, a signal selecting device 56 is used for transmitting the decoded data $F_{data}$ from the Viterbi decoder 36 to the binary array 59. The binary array is used for decoding the digital data decoded by the Viterbi decoder 36 into one of the N legal codes $F_c$. Each of the N reference levels RS corresponds to one of the N legal codes. In other words, the Viterbi decoder 36 compares the level corresponding to the data stream $F_{FDS}$ with one of the N reference levels RS corresponding to the legal codes $F_c$, and then adjusts the reference level RS based on the difference.

Referring to FIG. 2 again, the delay device 38 is coupled to the output of the equalizer 34 and used for delaying the equalized data stream $F_{FDS}$. The reference level adjusting device 42 is respectively coupled to an output of the binary array 59 and an output of the delay device 38. The reference level adjusting device 42 is used for receiving the code $F_c$ relative to the data stream $F_{FDS}$ and the equalized data stream $F_{FDS}$ corresponding to the code $F_c$ relative to the data stream $F_{FDS}$. The reference level adjusting device 42 is further used for adjusting the N reference levels RS in accordance with an algorithm including a conversion-speed-adjusting coefficient C and for outputting the N reference levels RS to the Viterbi decoder 36.

The algorithm is shown as the following:

$$Y_{i,j} = Y_{i,j-1} + C_i \times (X_{i,j} - Y_{i,j-1})$$

where i represents an index ranging from 1 to N, $Y_{i,j}$ represents the reference level RS corresponding to the i-th legal code and being calculated, $Y_{i,j-1}$ represents the reference level RS corresponding to the i-th legal code and been calculated, $X_{i,j}$ represents the level of the data stream relating to the i-th legal code and being calculated, and $C_i$ represents the conversion-speed-adjusting coefficient corresponding to the i-th legal code. Different coefficient $C_i$ can be selected based on different code $F_c$, and $Y_{i,0}$ is a default reference level RS. The algorithm is an embodiment utilizing low-pass filtering, and $C_i$ is positively related to the bandwidth of low-pass filtering.

Referring to FIG. 2 again, the Viterbi decoder 36 also outputs a majority signal $F_{ms}$ relative to the code $F_c$, wherein the majority signal $F_{ms}$ represents an accuracy of the decoded data $F_{data}$ outputted by the Viterbi decoder 36. The majority detector 40 is coupled to the output of the Viterbi decoder 36 and used for receiving the majority signal $F_{ms}$. When the accuracy of the majority signal $F_{ms}$ is unobvious, the majority detector 40 will output a control signal $F_L$ responsive to the majority signal $F_{ms}$ to the reference level adjusting device 42, so as to control the reference level adjusting device 42 not to adjust the corresponding reference level RS. In other words, $C_i$ is set as zero, or the value of $C_i$ is reduced temporarily.

The conversion-speed-adjusting coefficient generating device 44 is used for generating the conversion-speed-adjusting coefficient $C_i$ in response to at least one condition signal and for outputting the conversion-speed-adjusting coefficient $C_i$ to the reference level adjusting device 42. Each of the at least one condition detector is in charge of detecting a respective condition associated with the retrieved signal $F_{RS}$ and outputs one of the at least one condition signal corresponding to the detected condition to the conversion-speed-adjusting coefficient generating device 44. In a preferred embodiment, as shown in FIG. 2, the at least one condition detector includes one selected from the group consisting of a defect condition detector 46, a blank condition detector 48, a scratch condition detector 50, a training sequence condition detector 52, a servo condition detector 54, and a Phase-locked loop (PLL) condition detector 58.

Figure 5:
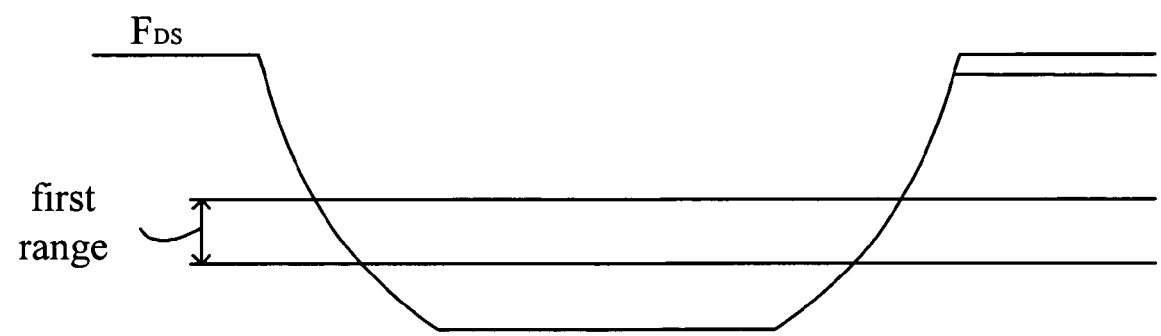
FIG. 5 is a schematic diagram illustrating the waveform of a defect signal.

Referring to FIG. 2 and FIG. 5, FIG. 5 is a schematic diagram illustrating the waveform of a defect signal $F_{DS}$ detected by the defect condition detector 46 shown in FIG. 2. The above-mentioned defect condition, such as scratch, represents the data stored in the optical information recording medium cannot be identified at all. The defect condition detector 46 predetermines a first range and has an input for receiving the signal $F_{DS}$. When the received signal $F_{DS}$ is lower than the lower limit of the first range, the defect condition detector 46 will output a defect condition signal $F_D$. The conversion-speed-adjusting coefficient generating device 44 will respond to the defect condition signal $F_D$ and output a minimum or zero as the conversion-speed-adjusting coefficient C. Then, a default reference level enabling device 60 responds to the defect condition signal $F_D$ and, based on a user setting, selectively loads a default reference level. Afterward, when the received signal $F_{DS}$ is higher than the upper limit of the first range, the defect condition detector 46 will output a defect condition lifted signal $F_{DL}$. The conversion-speed-adjusting coefficient generating device 44 will respond to the defect condition lifted signal $F_{DL}$ and output the conversion-speed-adjusting coefficient $C_i$, such as [0.5, 0.5, ... 0.5], representing a default value. Then, the default reference level enabling device 60 responds to the defect condition lifted signal $F_{DL}$ and, based on the user setting, selectively loads a default reference level to converge to a target value or does not loads the initial value to converge to the target value.

Figure 6:
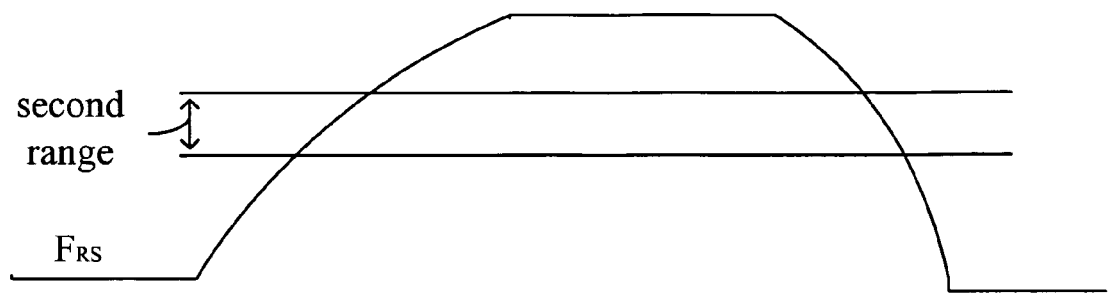
FIG. 6 is a schematic diagram illustrating the waveform of a blank signal.

Referring to FIG. 2 and FIG. 6, FIG. 6 is a schematic diagram illustrating the waveform of a blank signal detected by the blank condition detector 48 shown in FIG. 2. Similar to the above-mentioned operation of the defect condition detector 46, the blank condition detector 48 predetermines a second range for the blank condition. The blank condition represents the blank area on the optical information recording medium. The blank condition detector 48 has an input for receiving $F_{DS}$. When the current $F_{DS}$ is higher than the upper limit of the second range, the blank condition detector 48 will output a blank condition signal $F_b$. The conversion-speed-adjusting coefficient generating device 44 will respond to the blank condition lifted signal $F_b$ and output the conversion-speed-adjusting coefficient $C_i$ representing zero. Then, the default reference level enabling device 60 responds to the blank condition signal $F_b$ and, based on the user setting, selectively loads a default reference level (load_ini). Afterward, when the signal $F_{DS}$ is lower than the lower limit of the second range, the blank condition detector 48 will output a blank condition lifted signal $F_{bl}$. The conversion-speed-adjusting coefficient generating device 44 will respond to the blank condition lifted signal $F_{bl}$ and output the conversion-speed-adjusting coefficient $C_i$ representing the default value. Then, the default reference level enabling device 60 responds to the blank condition lifted signal $F_{b1}$ and, based on the user setting, selectively loads a default reference level to converge to a target value or does not loads the initial value to converge to the target value.

Figure 7:
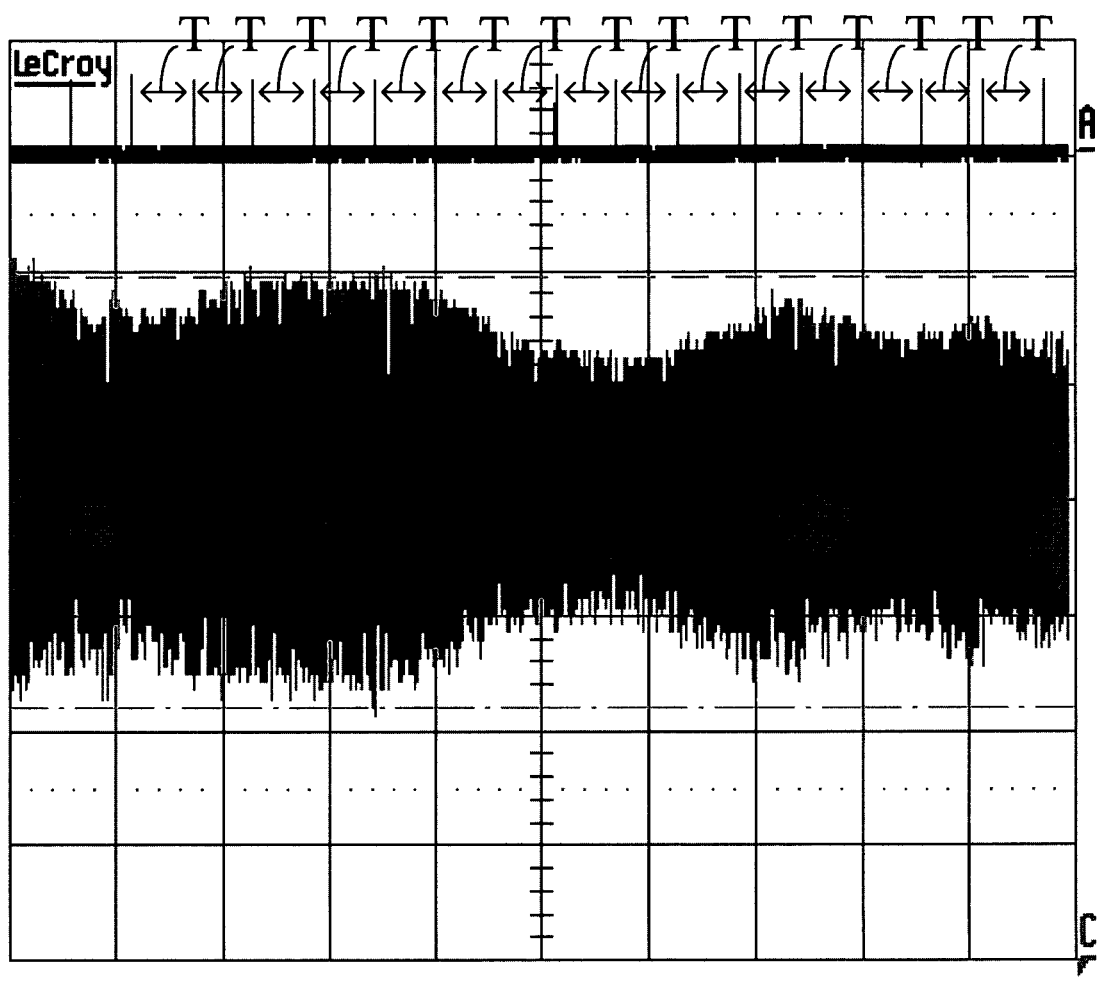
FIG. 7 is a schematic diagram illustrating the waveform of a scratch signal.

Referring to FIG. 2 and FIG. 7, FIG. 7 is a schematic diagram illustrating the waveform of a scratch signal detected by the scratch condition detector 50 shown in FIG. 2. The scratch condition represents the data stored in the optical information recording medium is damaged but still can be identified, e.g. finger print, slight scratch, and so on. The scratch condition detector 50 predetermines a third range for the scratch condition. The scratch condition detector 50 has an input for receiving a data stream $F_{DS}$. When the variation of the received data stream $F_{DS}$ exceeds the third range during a predetermined span of time T, the scratch condition detector 50 will output a scratch condition signal $F_s$. The conversion-speed-adjusting coefficient generating device 44 will respond to the scratch condition lifted signal $F_s$ and output the conversion-speed-adjusting coefficient $C_i$ larger than the default value. Then, the default reference level enabling device 60 responds to the scratch condition signal $F_s$, based on the user setting, selectively loads a default reference level, and maintains the initial value until the scratch condition is lifted. Afterward, when the variation of the received data stream $F_{DS}$ varies within the third range during the predetermined span of time T, the scratch condition detector 50 will output a scratch condition lifted signal $F_{s1}$. The conversion-speed-adjusting coefficient generating device 44 will respond to the scratch condition lifted signal $F_{sl}$ and output the conversion-speed-adjusting coefficient $C_i$ representing the default value. Then, the default reference level enabling device 60 responds to the scratch condition lifted signal $F_{s1}$ and, based on the user setting, selectively loads a default reference level to converge to a target value or does not loads the initial value to converge to the target value.

Referring to FIG. 2, when the signal $F_{RS}$ retrieved by the optical information reproducing system is a training sequence, the training sequence condition detector 52 detects whether the decoded data $F_{data}$ outputted from the Viterbi decoder is a training sequence, and then outputs a training sequence condition signal $F_{ts}$. Because the training sequence is a known sequence, the training sequence condition detector 52 can output a self-generated training sequence $F_t$ to a signal selecting device 56. Then, the conversion-speed-adjusting coefficient generating device 44 will respond to the training sequence condition signal $F_{ts}$ and output the conversion-speed-adjusting coefficient $C_i$ larger than the default value. Afterward, when the training sequence does not appear any more, the training sequence condition detector 52 will output a training sequence condition lifted signal $F_{tsl}$. The conversion-speed-adjusting coefficient generating device 44 will respond to the training sequence condition lifted signal $F_{tsl}$ and output the conversion-speed-adjusting coefficient $C_i$ representing the default value.

In a preferred embodiment, the training sequence condition detector 52 provides the training sequence $F_t$ to the signal selecting device 56. Before receiving the training sequence $F_t$, the signal selecting device 56 is used for receiving the decoded data $F_{data}$ and outputting the code $F_c$ to the reference level adjusting device 42. When the training sequence condition detector 52 receives the training sequence, the signal selecting device 56 is notified to output a training sequence $F_t$ generated by the training sequence condition detector 52 to the reference level adjusting device 42. In another preferred embodiment, when the training sequence condition detector 52 detects there is not any training condition and does not output the training sequence $F_t$ to the signal selecting device 56, the signal selecting device 56 will select the decoded data $F_{data}$ as the input. At the same time, the training sequence condition detector 52 outputs the training sequence condition signal $F_{ts}$ to notify the conversion-speed-adjusting coefficient generating device 44 to output the conversion-speed-adjusting coefficient $C_i$ larger than the default value. Afterward, when training sequence does not appear any more, the training sequence condition detector 52 will output a training sequence condition lifted signal $F_{tsl}$. The conversion-speed-adjusting coefficient generating device 44 will respond to the training sequence condition lifted signal $F_{tsl}$ and output the conversion-speed-adjusting coefficient $C_i$ representing the default value.

Referring to FIG. 2, the servo condition detector 54 is used for detecting whether the signal $F_{RS}$ retrieved by the optical information reproducing system is at a track status. When the optical information reproducing system begins to track the optical information recording medium, the servo condition detector 54 will output a track beginning signal $F_{tb}$. The conversion-speed-adjusting coefficient generating device 44 will respond to the track beginning signal $F_{tb}$ and output the conversion-speed-adjusting coefficient $C_i$ representing zero. Then, the default reference level enabling device 60 responds to the track beginning signal $F_{tb}$, based on the user setting, selectively loads a default reference level, and maintains the initial value until the condition is lifted. Afterward, when the optical information reproducing system stops to track the optical information recording medium, the servo condition detector 54 will output a track end signal $F_{te}$. The conversion-speed-adjusting coefficient generating device 44 will respond to the track end signal $F_{te}$ and output the conversion-speed-adjusting coefficient $C_i$ representing the default value. Then, the default reference level enabling device 60 responds to the track end signal $F_{te}$ and, based on the user setting, selectively loads a default reference level to converge to a target value or does not loads the initial value to converge to the target value.

Figure 8:
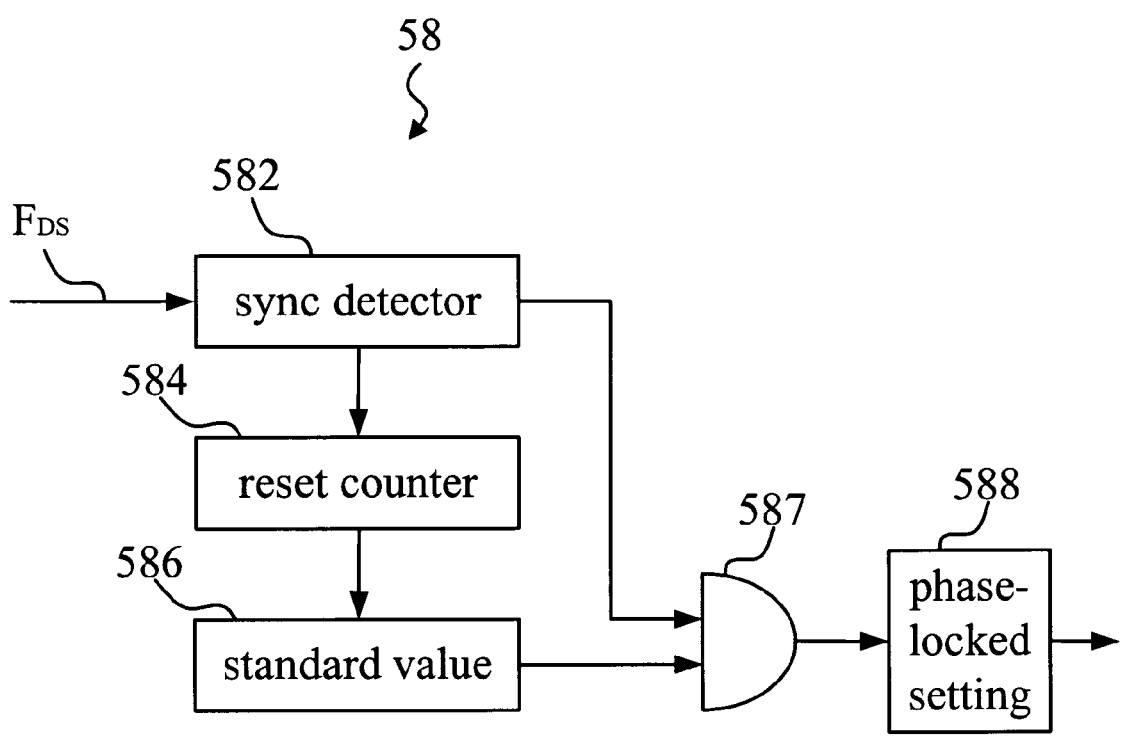
FIG. 8 is a schematic diagram illustrating the PLL shown in FIG. 2.

Referring to FIG. 8, FIG. 8 is a schematic diagram illustrating the PLL 58 shown in FIG. 2. The PLL 58 includes a sync detector 582. The sync detector 582 is used for detecting the distance between each frame sync bit of the adjusted data stream $F_{FDS}$. A reset counter 584 is used for driving a standard value 586. A comparator 587 is used for judging whether the distance between each frame sync bit detected by the sync detector 582 conforms to the standard value, so as to determine whether the PLL is locked. If the PLL is not locked, a phase-locked setting 588 will output zero or a minimum as the conversion-speed-adjusting coefficient, based on the user setting, selectively loads a default reference level, and maintains the initial value until the condition is lifted. If the PLL is locked, the default conversion-speed-adjusting coefficient will be outputted.

As shown in FIG. 2, the decoding apparatus 30 further includes a slicer 35, a multiplexer 41, an area type detector 43, and a memory 45 for storing a reference level corresponding to a second type of the area.

The slicer 35 is coupled to the output of the equalizer 34 and used for converting the adjusted data stream $F_{FDS}$ into a binary data. The slicer 35 transmits the binary signal to the signal selecting device 56. In practical application, if a disc has a lower recording density, because the accuracy of the slicer to decode data is credible, the signal selecting device 56 can selectively replace the decoded data $F_{data}$ by the binary signal. The delay time of the slicer is smaller than the Viterbi decoder, so the delay time of the delay device 38 can be reduced.

Because there are always some areas different from the data area on the optical information recording medium, e.g. header area, the characteristic of the reference level of the signal RF in the above-mentioned area is different from the reference level of the data area. Therefore, the memory 45 stores the reference levels corresponding to various types of area (not data area), such as the reference level corresponding to the header area. As shown in FIG. 2, the multiplexer 41 is connected between the Viterbi decoder 36 and the reference level adjusting device 42. The area type detector 43 is used for determining the signal $F_{RS}$ corresponds to which type of area on the optical information recording medium, and then for outputting a determining signal to the multiplexer 41. According to different type of area, the multiplexer 41 selects the reference level from the reference level adjusting device 42 or the memory 45 and then provides the selected reference level to the Viterbi decoder 36. Therefore, higher accuracy can be obtained in the header area. $C_i$ of the conversion-speed-adjusting coefficient generating device is set as zero or other default value.

Figure 9:
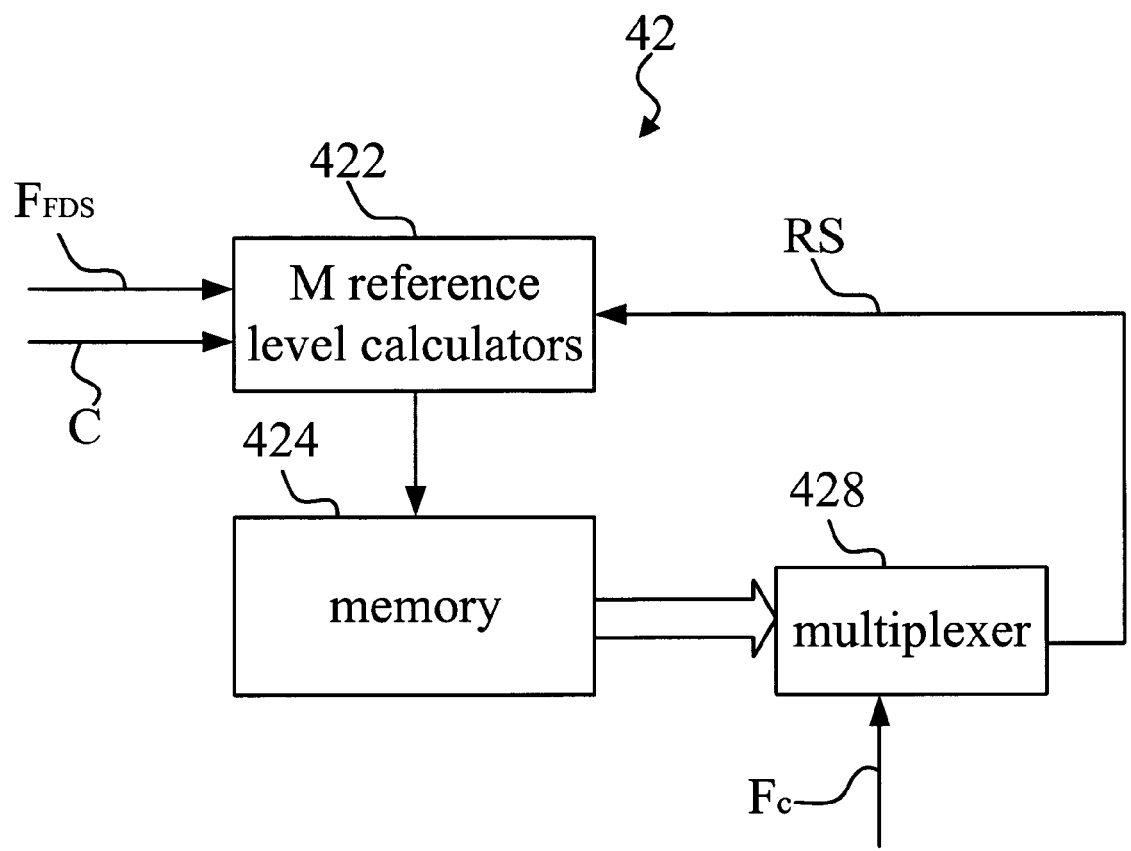
FIG. 9 is a schematic diagram illustrating the detailed structure of the reference level adjusting device according to a preferred embodiment of the invention.
Figure 10:
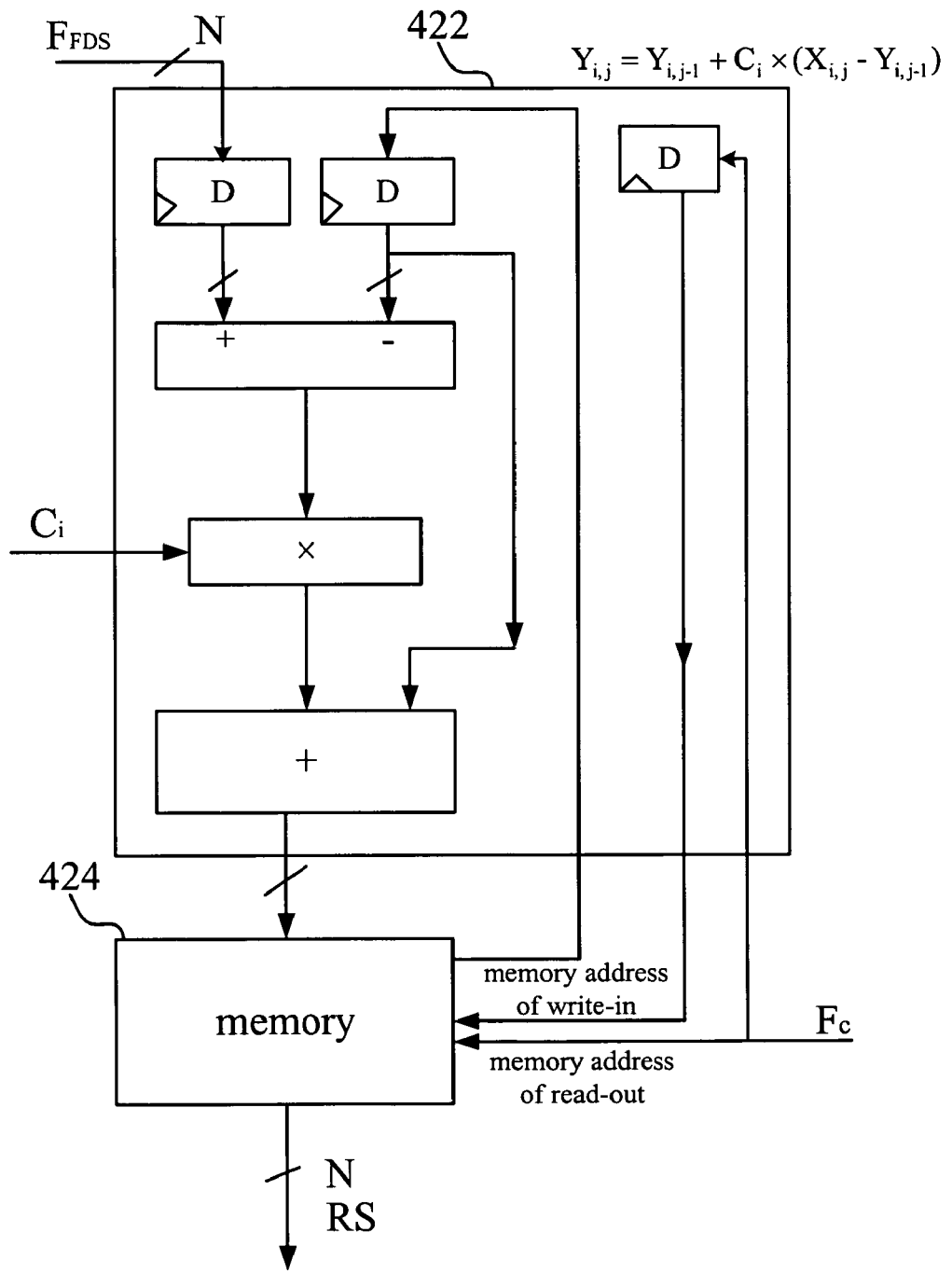
FIG. 10 is a schematic diagram illustrating how the reference level calculator works when the number of the reference level calculator is equal to 1.

Referring to FIG. 9, FIG. 9 is a schematic diagram illustrating the detailed structure of the reference level adjusting device 42 according to a preferred embodiment of the invention. The reference level adjusting device 42 includes M reference level calculators 422, a memory 424 for storing N reference levels RS, and a multiplexer 428. At start, the code $F_c$ is transmitted to the multiplexer 428, and then the N reference levels RS stored in the memory 424 is also transmitted to the multiplexer 428. According to the received code $F_c$, the multiplexer 428 selects one from the N reference levels RS corresponding to the code $F_c$ and transmits the selected reference level RS to the M reference level calculators 422. The M reference level calculators 422 receive the equalized signal $F_{FDS}$ and the conversion-speed-adjusting coefficient $C_i$, so as to calculate the reference level selected by the multiplexer 428 and store the calculating result in the memory 424. More particularly, M is a nature number and smaller than N. Compared to the prior art, the invention only utilizes M calculators to calculate N reference levels. In practical application, M can be designed as 1, as shown in FIG. 10. The operating method of FIG. 10 includes the following steps: (1) according to the code $F_c$, selecting one from the N reference levels stored in the memory 424 to be adjusted; (2) inputting the selected reference level to a reference level calculator 422; (3) according to an algorithm including a conversion-speed-adjusting coefficient $C_i$, adjusting the reference level RS; and (4) storing the adjusted reference level RS in the memory 424.

Figure 11:
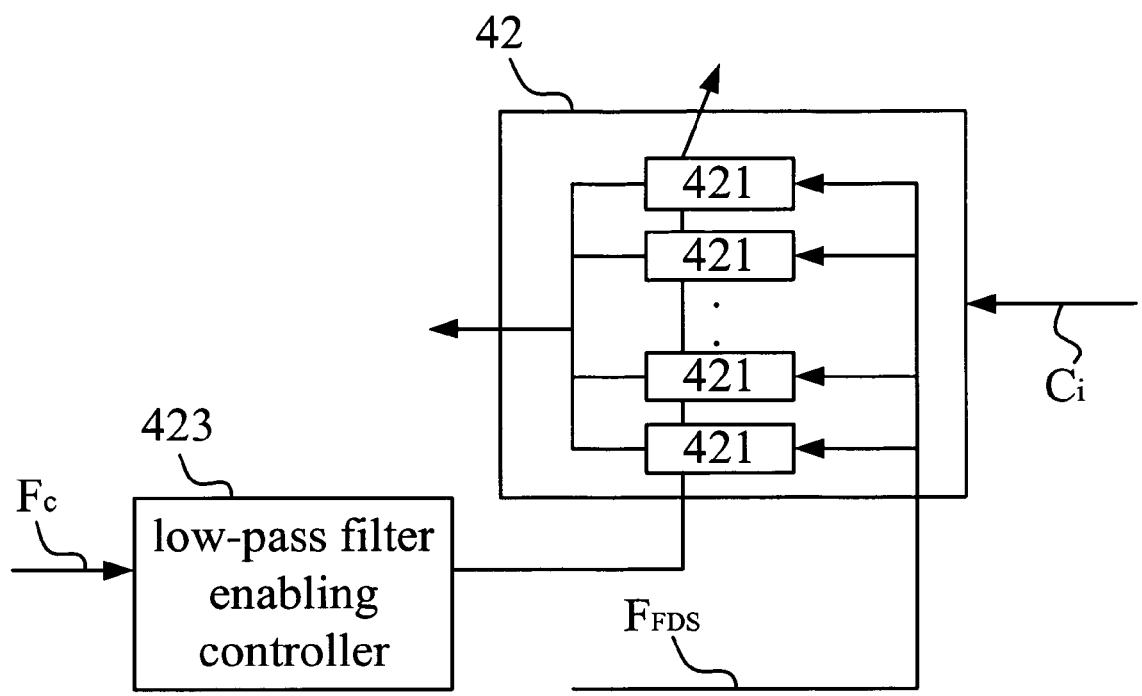
FIG. 11 is a schematic diagram illustrating the detailed structure of the reference level adjusting device according to another preferred embodiment of the invention.

In another preferred embodiment, as shown in FIG. 11, the reference level adjusting device 42 consists of a plurality of low-pass filters 421. Each of the low-pass filters 421 corresponds to one reference level RS. As shown in FIG. 11, the low-pass filters are controlled by a low-pass filter enabling controller 423 to enable, based on the code $F_c$, the low-pass filters 421 of the corresponding reference level. According to the conversion-speed-adjusting coefficient $C_i$, the reference level adjusting device 42 sets the bandwidth of each low-pass filter and then filters the adjusted data stream $F_{FDS}$, so as to generate the reference level RS.0

In the prior art, once the disc is damaged, e.g. scratch, finger print, and so on, the reference level generating device 22 will generate an incorrect reference level, so that the Viterbi decoder 14 will generate incorrect data. Therefore, the invention discloses a decoding apparatus 30 capable of correcting the reference level. By utilizing the reference level adjusting device 42, the conversion-speed-adjusting coefficient generating device 44, the at least one condition detector, and the algorithm, even though the signal $F_{RS}$ retrieved by the optical information reproducing system from the optical recording medium is incorrect, the invention can still adjust the conversion-speed-adjusting coefficient $C_i$ to make the reference level adjusting device 42 output the reference level towards the correct value, such that the Viterbi decoder 36 can generate the decoded data $F_{data}$ towards the correct data.

Furthermore, the number of the calculators of the reference level adjusting device 42 can be less than the number of reference levels, so as to reduce the cost and the chip size.

Figure 12:
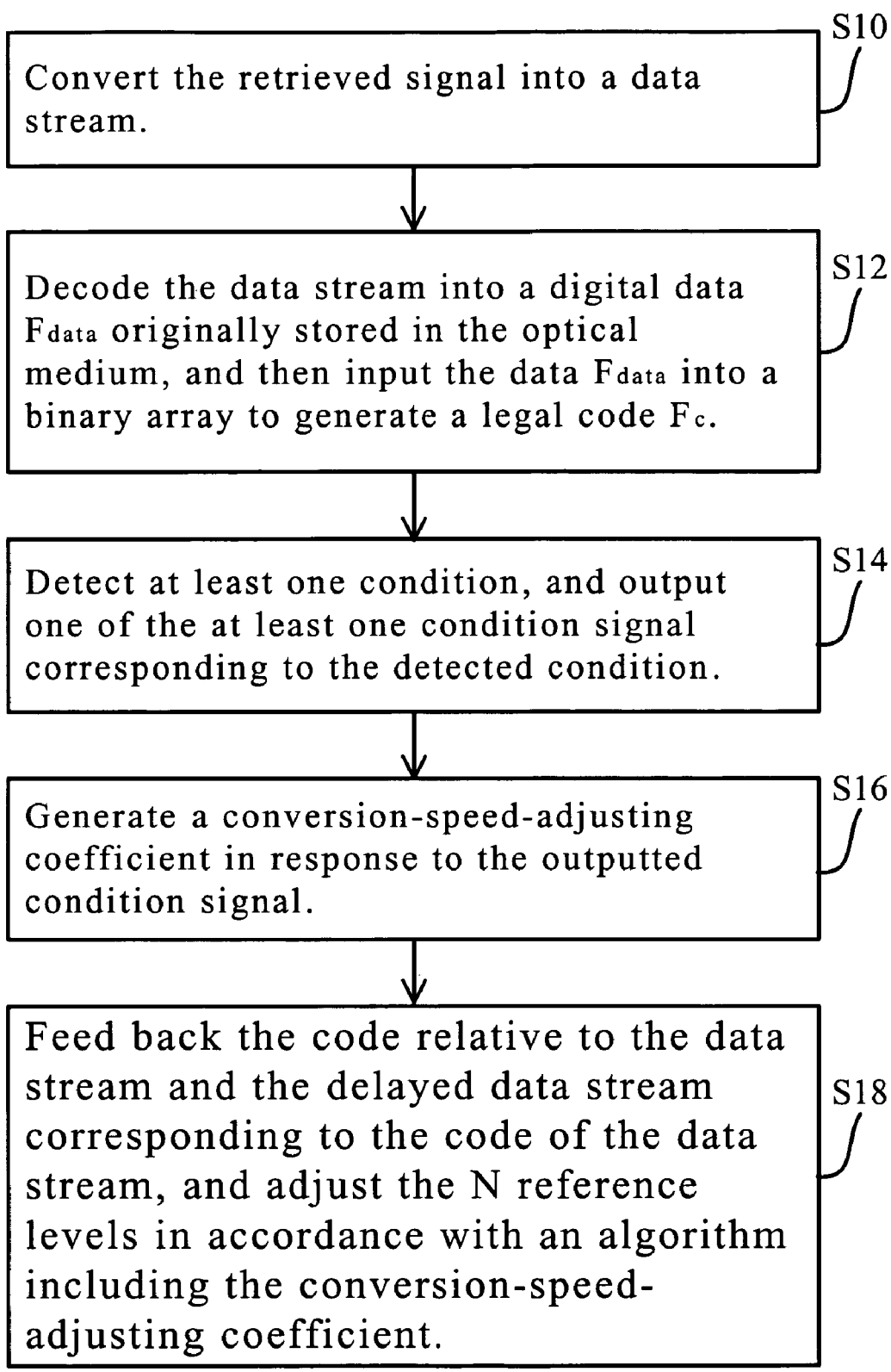
FIG. 12 is a flowchart illustrating the decoding method according to a preferred embodiment of the invention.

Referring to FIG. 12, FIG. 12 is a flowchart illustrating the decoding method according to a preferred embodiment of the invention. In an optical information reproducing system, the decoding method is used for performing decoding of a signal retrieved by the system from an optical information recording medium. N legal codes are predetermined.

According to the decoding method of the invention, at start, step S10 is performed to convert the retrieved signal into a data stream. Afterward, step S12 is performed. In step S12, in a Viterbi decoding manner, the data stream is decoded into a digital data $F_{data}$ originally stored in the optical medium, and then the data $F_{data}$ is inputted into a binary array to generate a legal code $F_c$. Step S14 is then performed. In step S14, at least one condition is detected, and one of the at least one condition signal corresponding to the detected condition is outputted. Step S16 is then performed. In step S16, a conversion-speed-adjusting coefficient in response to the outputted condition signal is generated. Step S18 is then performed. In step S18, the code relative to the data stream and the delayed data stream corresponding to the code of the data stream are fed back, and the N reference levels are adjusted in accordance with an algorithm including the conversion-speed-adjusting coefficient.

Figure 13:
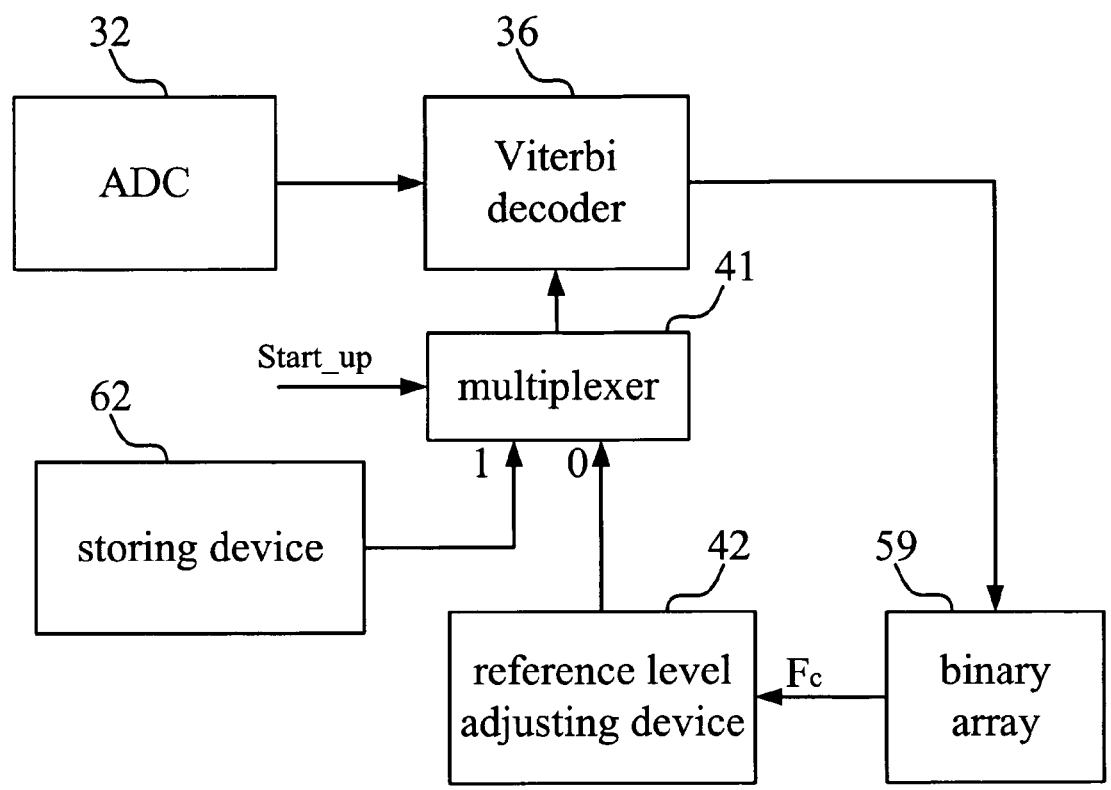
FIG. 13 is a schematic diagram illustrating the source of the reference level of the Viterbi decoder when the system is started.

In practical application, when a data is decoded, the reference level of the reference level adjusting device 42 may be incorrect, so that the Viterbi decoder 36 may generate incorrect decoded data. Thus, the reference level adjusting device 42 will not get correct code $F_c$ to obtain the correct reference level. The invention discloses a method to solve the above-mentioned problem. As shown in FIG. 13, when an optical information producing system is started, a start signal (strat_up) will activate the multiplexer 41 to select the conventional fixed reference level stored in a storing device 62, and then the fixed reference level is used as the reference level for the Viterbi decoder 36. Therefore, the correct result can be obtained via the Viterbi decoder. At this time, the above-mentioned nearly correct result $F_c$ is used to adjust the reference level RS of the reference level adjusting device 42. After a span of time, the reference level adjusting device 42 will get correct reference level RS. At this time, the source of the reference level of the Viterbi decoder 36 is changed to the reference level adjusting device 42, so as to solve the above-mentioned problem.

Figure 14A:
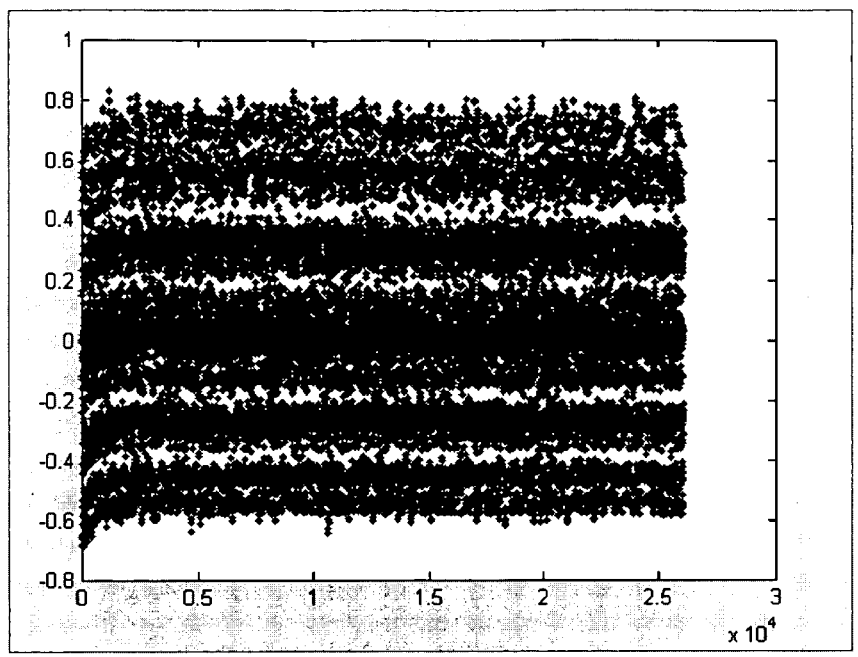
FIG. 14A is a diagram illustrating the levels of the retrieved signals being more diffused.
Figure 14B:
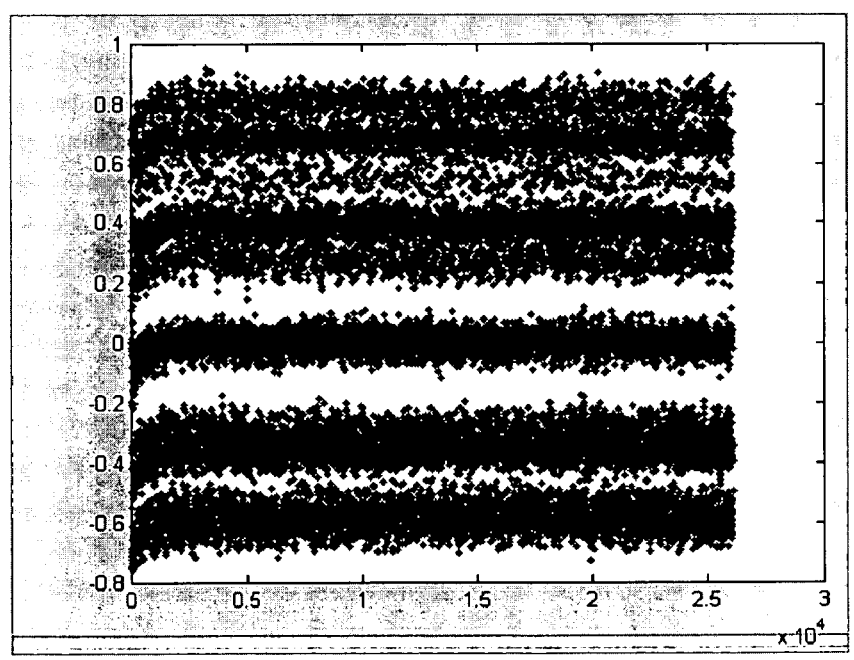
FIG. 14B is a diagram illustrating the levels of the retrieved signals being more centered.
Figure 15:
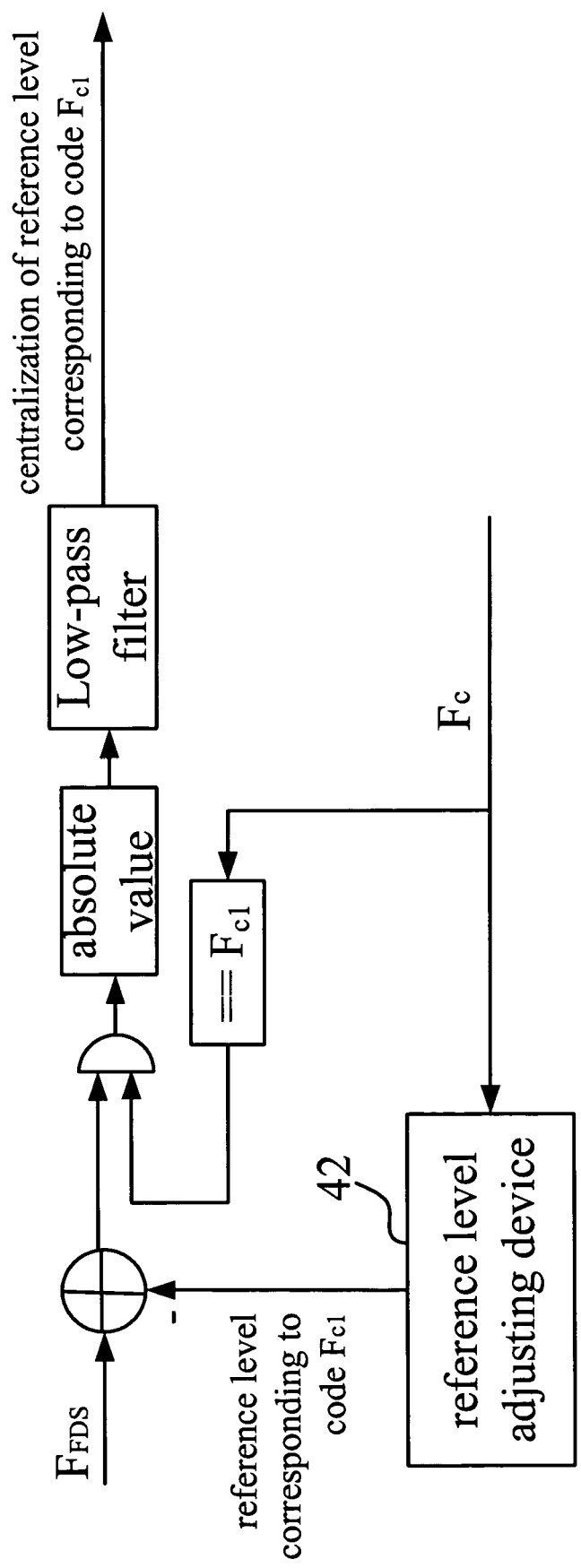
FIG. 15 is schematic diagram illustrating the apparatus capable of determining the centralization of the reference levels.

The quality of an optical reproducing signal can be estimated by the distribution of the reference levels. The above has mentioned that the optical reproducing signals (retrieved signals FRS) always center on some specific reference levels after being synchronously sampled, as shown in FIG. 3. Referring to FIG. 14A and FIG. 14B, FIG. 14A is a diagram illustrating the levels of the retrieved signals being more diffused. FIG. 14B is a diagram illustrating the levels of the retrieved signals being more centered. If the signals are more centered, the quality of the signal is better. Thus, the quality of an optical reproducing signal can be determined by the centralization of the reference levels. The centralization of the reference levels can be obtained by the apparatus shown in FIG. 15. As shown in FIG. 15, the apparatus performs a low-pass filtering on the absolute difference between a reference level corresponding to a code $F_{c1}$ set by a user and the corresponding signal. Therefore, the centralization of the reference level is obtained, and the centralization of all reference levels can be also obtained in this manner. The detailed operation of the apparatus includes the following steps: (1) determining whether the code Fc is the code $F_{c1}$ set by the user; (2) if it is a YES in (1), inputting the absolute difference between $F_{FDS}$ and the reference level corresponding to the code $F_{c1}$ into the low-pass filter; (3) compiling statistics after a span of time to obtain the centralization of the reference level corresponding to the code $F_{c1}$.

In practical application, the optical information reproducing system usually utilizes an adaptive equalizer capable of adjusting the coefficient to equalize the signal, so as to improve the quality of the signal. According to the signal and a reference signal, the adaptive equalizer can adjust the coefficient. The reference signal can be generated by the code $F_c$ via a training sequence, a slicing decoder, or a Viterbi decoder performing decoding operation. A common adaptive equalizer is called PR-1221, wherein the relation between the reference signal and the code $F_c$ is as the following and $F_c$ is assumed as binary:

$$Fc = [\, b_0 \quad b_1 \quad b_2 \quad b_3 \,],$$

$$\hat{y} = (2*Fc-1) \cdot \begin{bmatrix} 1 \\ 2 \\ 2 \\ 1 \end{bmatrix},$$

Wherein $F_c$ is a digital array, e.g. Fc=[0 1 1 1].

Figure 16:
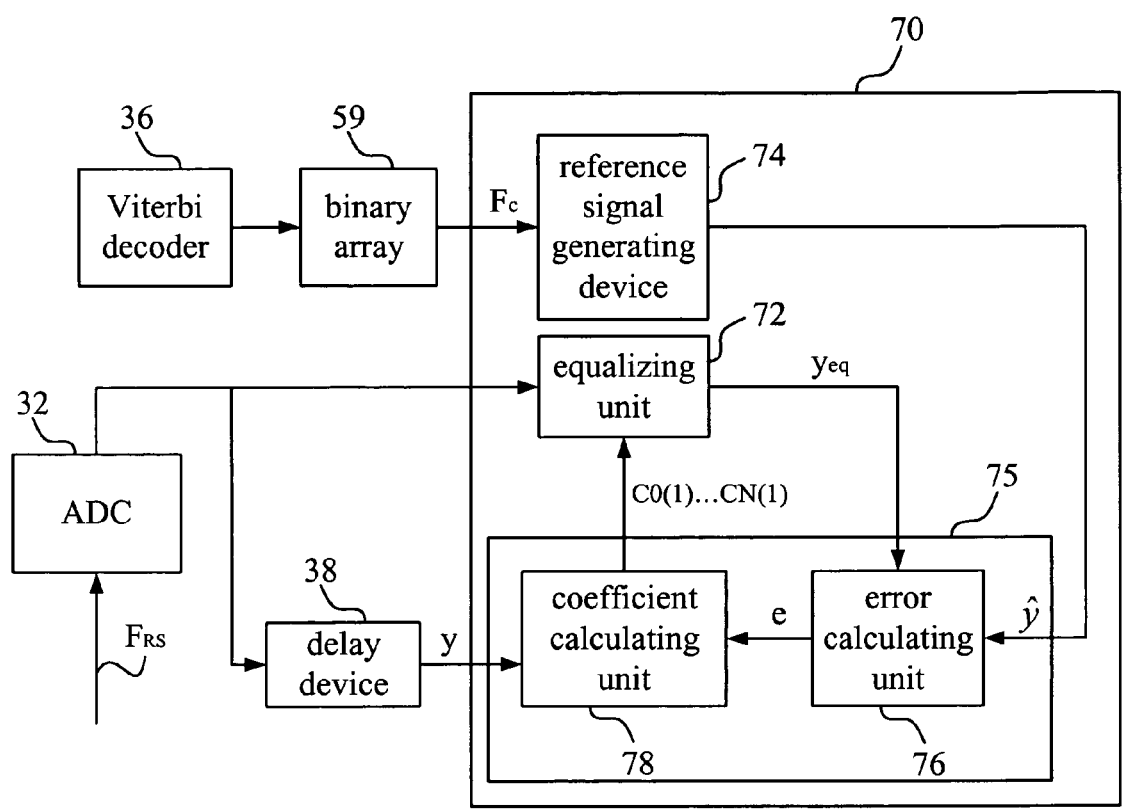
FIG. 16 is a functional block diagram illustrating an adaptive equalizer of the prior art.

Referring to FIG. 16, FIG. 16 is a functional block diagram illustrating an adaptive equalizer 70 of the prior art. The adaptive equalizer 70 includes an equalizing unit 72, a reference signal generating device 74, and a coefficient adaptive circuit 75. The coefficient adaptive circuit 75 includes an error calculating unit 76 and a coefficient calculating unit 78. The equalizing unit 72 is a FIR filter having a plurality of coefficients $C_0(0), C_1(0), \ldots, C_N(0)$ and capable of generating an equalizing signal $y_{eq}$. The reference signal generating device 74 can utilize a code $F_c$ to generate a desired signal $\hat{y}$, wherein the code $F_c$ is outputted by a binary array after a training sequence, a slicing decoder, or a Viterbi decoder performs decoding operation. Afterward, the error calculating unit 76 subtracts the desired signal $\hat{y}$ from the equalizing signal $y_{eq}$ to generate an error signal e. Finally, the adaptive equalizer 70 utilizes the coefficient calculating unit 78 to perform least mean square (LMS) calculation according to the received signal y and the error signal e, so as to generate a plurality of better coefficients $C_0(1), C_1(1), \ldots, C_N(1)$. The calculation of the conventional coefficient calculating unit 78 is described as the following equation:

$$C_j(k)=C_j(k-1)-\tau \cdot e(k) \cdot y(k). \qquad \text{Equation 1:}$$

In the above equation 1, $\tau$ represents a conversion-speed-adjusting coefficient. Afterward, the coefficients $C_0(0), C_1(0), \ldots, C_N(0)$ used by the equalizing unit 72 are replaced by the coefficients $C_0(1), C_1(1), \ldots, C_N(1)$. When the above-mentioned process is performed repeatedly, the error signal e will gradually tend to zero, and then the coefficients $C_0, C_1, \ldots, C_N$ will also tend to steady state. When the condition changes, the error signal e will be amplified, and the coefficients will also change obviously, so that the adaptive equalizer 70 will, according to the above-mentioned operation, adjust the coefficients of the equalizing unit 72.

Figure 17:
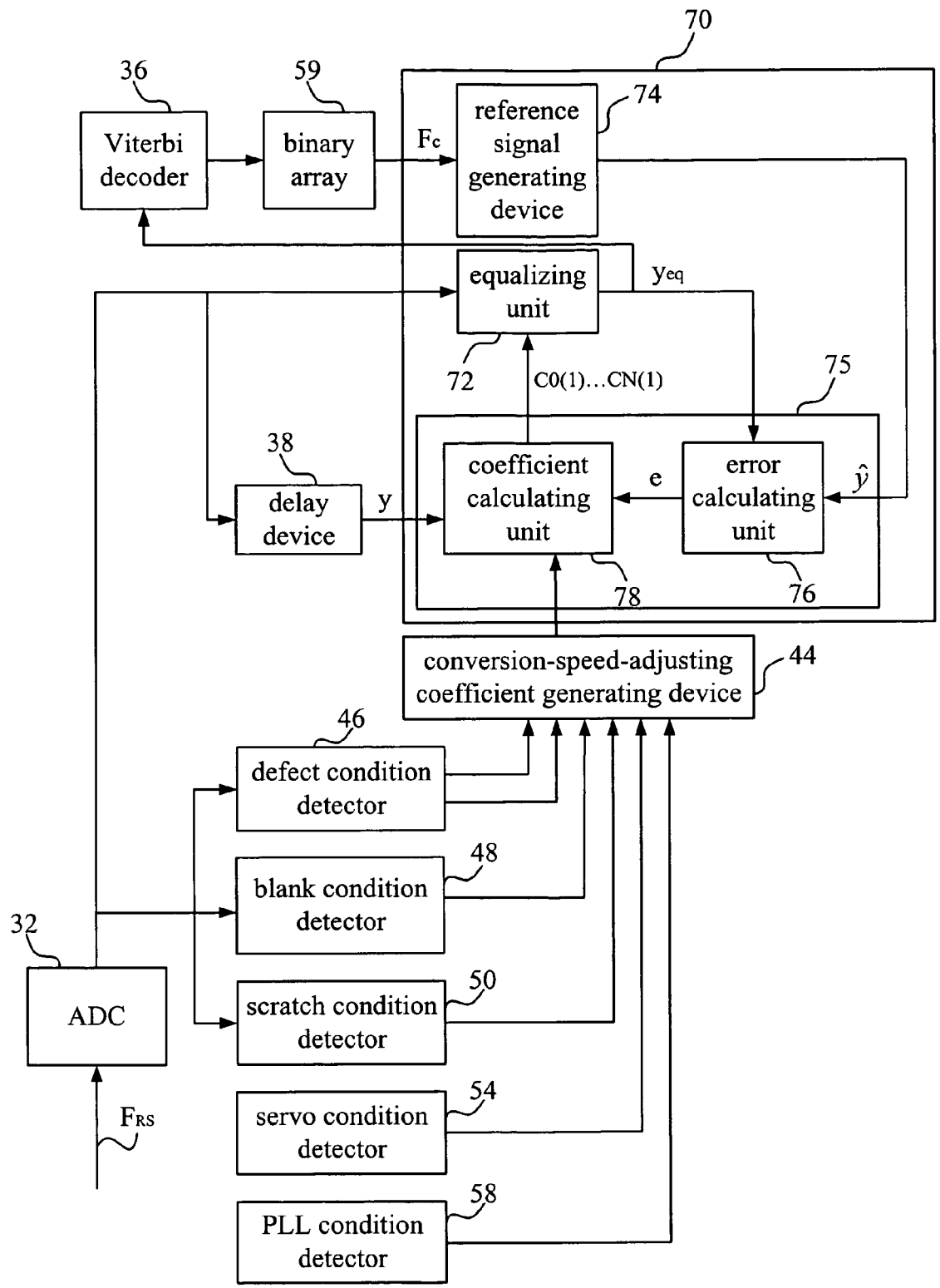
FIG. 17 is a functional block diagram illustrating a structure capable of protecting the adaptive equalizer.

However, the adaptive equalizer also utilizes the Viterbi decoder to calculate the desired signal $\hat{y}$. When there is a defect, scratch, or blank on the disc, the data decoded by the Viterbi decoder will be incorrect, and then the adaptive equalizer will not get correct coefficient. Therefore, the method applied in the reference level adjusting device can be also used to protect the adaptive equalizer, as shown in FIG. 17

What is claimed is:

1. In an optical information reproducing system, a decoding apparatus for decoding a signal retrieved by said system from an optical information recording medium, N legal codes being predetermined, wherein N is a natural number, said decoding apparatus comprising:

an Analog-to-digital converter (ADC) for converting the retrieved signal into a data stream;

a Viterbi decoder, coupled to an output of the ADC, for decoding, according to N reference levels and a level of the data stream, the data stream into a digital data, wherein each of the N reference levels corresponds to one of the N legal codes;

a binary array for decoding the digital data decoded by the Viterbi decoder into one of the N legal codes;

a delay device, coupled to the output of the ADC, for delaying the data stream, and outputting a delayed data stream corresponding to the data stream;

a reference level adjusting device, respectively coupled to an output of the Viterbi decoder and an output of the delay device, for receiving the code relative to the data stream and the delayed data stream corresponding to the data stream, adjusting the N reference levels in accordance with an algorithm including a conversion-speed-adjusting coefficient, and outputting the N reference levels to the Viterbi decoder;

a conversion-speed-adjusting coefficient generating device for generating the conversion-speed-adjusting coefficient in response to at least one condition signal, and outputting the conversion-speed-adjusting coefficient to the reference level adjusting device; and at least one condition detector which each is in charge of detecting a respective condition associated with the retrieved signal and outputs one of the at least one condition signal corresponding to the detected condition to the conversion-speed-adjusting coefficient generating device.

2. The decoding apparatus of claim 1, wherein the algorithm is as follows:

$$Y_{i,j}=Y_{i,j-1}+C_i \times (X_{i,j}-Y_{i,j-1}),$$

where i represents an index ranging from 1 to N, $Y_{i,j}$ represents the reference level corresponding to the ith legal code and being calculated, $Y_{i,j-1}$ represents the reference level corresponding to the ith legal code and been calculated, $X_{i,j}$ represents the level of the data stream relating to the ith legal code and being calculated, and $C_i$ represents the conversion-speed-adjusting coefficient corresponding to the ith legal code.

3. The decoding apparatus of claim 1, wherein the reference level adjusting device comprises a plurality of low-pass filters, the reference level adjusting device sets up a bandwidth of each low-pass filter in accordance with the conversion-speed-adjusting coefficient.

4. The decoding apparatus of claim 1, wherein the at least one condition detector comprises one selected from the group consisting of a defect condition detector, a blank condition detector, a scratch condition detector, a training sequence condition detector, a servo condition detector, and a Phase-locked loop (PLL) condition detector.

5. The decoding apparatus of claim 1, wherein the Viterbi decoder also outputs a majority signal relative to the code, said decoding apparatus further comprises a majority detector, coupled to the output of the Viterbi decoder, for receiving the majority signal, and outputting a control signal responsive to the majority signal to the reference level adjusting device which is operated by the control signal.

6. The decoding apparatus of claim 1, wherein the optical information recording medium comprises a first type of area, on which the N legal codes are allowed to be recorded, and a second type of area different from the first type of area, said decoding apparatus further comprises a memory for storing a default reference level corresponding to the second type of the area, when the retrieved signal relates to data recorded on the second type of area, the reference level adjusting device receives the default reference level from the memory to replace the N reference levels.

7. The decoding apparatus of claim 1, further comprising a signal selecting device coupled between the Viterbi decoder and the binary array, when the training sequence condition detector detects the training sequence condition, the training sequence condition generates a training sequence, and outputs the training sequence to the binary array through the signal selecting device to replace the digital data.

8. In an optical information reproducing system, a decoding method for performing decoding of a signal retrieved by said system from an optical information recording medium, N legal codes being predetermined, wherein N is a natural number, said decoding method comprising the steps of:

converting the retrieved signal into a data stream;

delaying the data stream to generate a delayed data stream corresponding to data stream;

in a Viterbi decoding manner, decoding, according to N reference levels and a level of the data stream, the data stream into a digital data, wherein each of the N reference levels corresponds to one of N legal codes;

decoding, by a binary array, the digital data into one of the N legal codes;

detecting at least one condition, and outputting one of the at least one condition signal corresponding to the detected condition;

generating a conversion-speed-adjusting coefficient in response to the outputted condition signal; and feeding back the code relative to the data stream and the delayed data stream corresponding to the code of the data stream, and adjusting the N reference levels in accordance with an algorithm including the conversion-speed-adjusting coefficient.

9. The decoding method of claim 8, wherein the algorithm is as follows:

$$Y_{i,j}=Y_{i,j-1}+C_i \times (X_{i,j}-Y_{i,j-1}),$$

where i represents an index ranging from 1 to N, $Y_{i,j}$ represents the reference level corresponding to the ith legal code and being calculated, $Y_{i,j-1}$ represents the reference level corresponding to the ith legal code and been calculated, $X_{i,j}$ represents the level of the data stream relating to the ith legal code and being calculated, and $C_i$ represents the conversion-speed-adjusting coefficient corresponding to the ith legal code.

10. The decoding method of claim 8, wherein in the step of adjusting the N reference levels, the N reference levels are generated by a plurality of low-pass filters, a bandwidth of each low-pass filter is set up in accordance with the conversion-speed-adjusting coefficient.

11. The decoding method of claim 8, wherein the leas one condition comprises one selected from the group consisting of a defect condition, a blank condition, a scratch condition, a training sequence condition, a servo condition, and a phase-locked loop(PLL) condition.

12. The decoding method of claim 8, wherein in the step of decoding, a majority signal relative to the code is also generated, said decoding method further comprises the step of generating a control signal in response to the majority signal, and wherein the step of adjusting the N reference levels is operated by the control signal.

13. The decoding method of claim 8, wherein the optical information recording medium comprises a first type of area, on which the N legal codes are allowed to be recorded, and a second type of area different from the first type of area, a default reference level being previously provided corresponding to the second type of area, when the retrieved signal relates to data recorded on the second type of area, the default reference level replaces the N reference levels to decode the data stream into the digital data.

14. The method of claim 11, wherein when the training sequence condition is detected, a training sequence is generated to replace the feed back digital data to adjust the N reference levels.

15. In an optical information reproducing system, a decoding apparatus for decoding of a signal retrieved by said system from an optical information recording medium, N legal codes being predetermined, wherein N is a natural number, said decoding apparatus comprising:
an analog-to-digital converter (ADC) for converting the retrieved signal into a data stream;
a Viterbi decoder, coupled to an output of the ADC, for decoding the data stream into one of the N legal codes in accordance with the N reference level and a level of the data stream, wherein each of the N reference levels corresponds to one of N legal codes;
a slicer, coupled to the output of the ADC, for decoding the data stream into a digital data;
a binary array, for decoding the digital data decoded by the slicer into one of the N legal codes;
a delay device, coupled to the output of the ADC, for delaying the data stream, and then outputting a delayed data stream corresponding to the data stream;
a reference level adjusting device, coupled to an output of the slicer and an output of the delay device, for receiving the code relative to the data stream and the delayed data stream corresponding to the code of the data stream, adjusting the N reference levels in accordance with an algorithm including a conversion-speed-adjusting coefficient, and outputting the N reference levels to the Viterbi decoder;
a conversion-speed-adjusting coefficient generating device for generating the conversion-speed-adjusting coefficient responsive to at least one condition signal, and outputting the conversion-speed-adjusting coefficient to the reference level adjusting device; and
at least one condition detector which each is in charge of detecting a respective condition associated with the retrieved signal and outputs one of the at least one condition signal corresponding to the detected condition to the conversion-speed-adjusting coefficient generating device.

16. The decoding apparatus of claim 15, wherein the algorithm is as follows:

$$Y_{i,j} = Y_{i,j-1} + C_i \times (X_{i,j} - Y_{i,j-1}),$$

where i represents an index ranging from 1 to N, $Y_{i,j}$ represents the reference level corresponding to the ith legal code and being calculated, $Y_{i,j-1}$ represents the reference level corresponding to the ith legal code and been calculated, $X_{i,j}$ represents the level of the data stream relating to the ith legal code and being calculated, and $C_i$ represents the conversion-speed-adjusting coefficient corresponding to the ith legal code.

17. In an optical information reproducing system, a decoding apparatus for decoding a signal retrieved by said system from an optical information recording medium, N legal codes being predetermined, wherein N is a natural number, said decoding apparatus comprising:
an Analog-to-digital converter (ADC) for converting the retrieved signal into a data stream;
a Viterbi decoder, coupled to an output of the ADC, for decoding the data stream into a digital data in accordance with N reference levels and a level of the data stream, wherein each of the N reference levels corresponds to one of the N legal codes;
a binary array for decoding the digital data decoded by the Viterbi decoder into one of the N legal codes;
a delay device, coupled to the output of the ADC, for delaying the data stream, and then outputting a delayed data stream corresponding to the data stream;
a reference level adjusting device, respectively coupled to an output of the Viterbi decoder and an output of the delay device, for receiving the code relative to the data stream and the delayed data stream corresponding to the relative code, adjusting the N reference levels in accordance with an algorithm including a conversion-speed-adjusting coefficient, and outputting the N reference levels to the Viterbi decoder;
wherein the reference level adjusting device comprises M calculators for calculating the N reference levels, while M is a natural number less than N.

18. In an optical information reproducing system, a decoding apparatus for decoding a signal retrieved by said system from an optical information recording medium, N legal codes being predetermined, wherein N is a natural number, said decoding apparatus comprising:
an Analog-to-digital converter (ADC) for converting the retrieved signal into a data stream;
a Viterbi decoder, coupled to an output of the ADC, for decoding, according to N reference levels and a level of the data stream, the data stream into a digital data, wherein each of the N reference levels corresponds to one of N legal codes;
a binary array for decoding the digital data decoded by the Viterbi decoder into one of the N legal codes;
a delay device, coupled to the output of the ADC, for delaying the data stream, and then outputting a delayed data stream corresponding to the data stream;
a reference level adjusting device, respectively coupled to an output of the Viterbi decoder and an output of the delay device, for receiving the code relative to the data stream and the delayed data stream corresponding to the code relative to the data stream, adjusting the N reference levels in accordance with an algorithm including a conversion-speed-adjusting coefficient, and outputting the N reference levels to the Viterbi decoder;
a conversion-speed-adjusting coefficient generating device for generating the conversion-speed-adjusting coefficient in response to at least one condition signal, and outputting the conversion-speed-adjusting coefficient to the reference level adjusting device;
at least one condition detector which each is in charge of detecting a respective condition associated with the retrieved signal and outputs one of the at least one condition signal corresponding to the detected condition to the conversion-speed-adjusting coefficient generating device; and
a default reference level enabling device, for generating a default reference level enabling signal in response to the at least one condition signal, outputting the default reference level enabling signal to the reference level adjusting device, wherein when the reference level adjusting device receives the default reference level enabling signal, the reference level adjusting device loads a default reference level corresponding to the default reference level enabling signal as an initial value.

19. In an optical information reproducing system, a decoding apparatus for decoding a signal retrieved by said system from an optical information recording medium, N legal codes being predetermined, wherein N is a natural number, said decoding apparatus comprising:

an Analog-to-digital converter (ADC) for converting the retrieved signal into a data stream;

a digital equalizer, coupled to an output of the ADC, outputting an equalized data stream corresponding to the data stream;

a Viterbi decoder, coupled to an output of the digital equalizer, for decoding, according to N reference levels and a level of the equalized data stream, the equalized data stream into a digital data, wherein each of the N reference levels corresponds to one of N legal codes;

a binary array for decoding the digital data decoded by the Viterbi decoder into one of the N legal codes;

a delay device, coupled to the output of the digital equalizer, for delaying the equalized data stream, and then outputting a delayed data stream corresponding to the equalized data stream;

a reference level adjusting device, respectively coupled to an output of the Viterbi decoder and an output of the delay device, for receiving the code relative to the equalized data stream and the delayed data stream corresponding to the code, adjusting the N reference levels in accordance with an algorithm including a conversion-speed-adjusting coefficient, and outputting the N reference levels to the Viterbi decoder;

a conversion-speed-adjusting coefficient generating device for generating the conversion-speed-adjusting coefficient in response to at least one condition signal, and outputting the conversion-speed-adjusting coefficient to the reference level adjusting device; and at least one condition detector which each is in charge of detecting a respective condition associated with the retrieved signal and outputs one of the at least one condition signal corresponding to the detected condition to the conversion-speed-adjusting coefficient generating device.

20. In an optical information reproducing system, a decoding apparatus for decoding a signal retrieved by said system from an optical information recording medium, N legal codes being predetermined, wherein N is a natural number, said decoding apparatus comprising:

an Analog-to-digital converter (ADC) for converting the retrieved signal into a data stream;

a digital equalizer with an adjustable coefficient, coupled to an output of the ADC, outputting an equalized data stream corresponding to the data stream;

a Viterbi decoder, coupled to an output of the digital equalizer, for decoding the equalized data stream into a digital data;

a binary array for decoding the digital data decoded by the Viterbi decoder into one of the N legal codes;

a delay device, coupled to the output of the ADC, for delaying the data stream, and then outputting a delayed data stream corresponding to the data stream;

a reference signal generator, coupled to an output of the binary array, for generating a reference signal by use of the code decoded by the binary array;

an error calculator, respectively coupled to an output of the reference signal generator and an output of the digital equalizer, for generating an equalized error signal;

an adjusting device, coupled to an output of the error calculator and an output of the delay device, for adjusting the adjustable coefficient for the digital equalizer in accordance with an algorithm including a conversion-speed-adjusting coefficient;

a conversion-speed-adjusting coefficient generating device for generating the conversion-speed-adjusting coefficient in response to at least one condition signal, and outputting the conversion-speed-adjusting coefficient to the adjusting device; and at least one condition detector which each is in charge of detecting a respective condition associated with the retrieved signal and outputs one of the at least one condition signal corresponding to the detected condition to the conversion-speed-adjusting coefficient generating device.

21. In an optical information reproducing system, a decoding apparatus for decoding a signal retrieved by said system from an optical information recording medium, N legal codes being predetermined, wherein N is a natural number, said decoding apparatus comprising:

an Analog-to-digital converter (ADC) for converting the retrieved signal into a data stream;

a Viterbi decoder, coupled to an output of the ADC, for decoding the data stream into a digital data in accordance with N reference levels and a level of the data stream, wherein each of the N reference levels corresponds to one of N legal codes;

a reference level adjusting device, for adjusting the N reference levels, and outputting the N reference levels to the Viterbi decoder; and a detecting device, for detecting a centralization of the N reference levels;

wherein the centralization of the N reference levels is used to indicate a quality of the retrieved signal.

22. In an optical information reproducing system, a decoding apparatus for decoding a signal retrieved by said system from an optical information recording medium, N legal codes being predetermined, wherein N is a natural number, said decoding apparatus comprising:

an Analog-to-digital converter (ADC) for converting the retrieved signal into a data stream;

a Viterbi decoder, coupled to an output of the ADC, for decoding the data stream into a digital data in accordance with N reference levels and a level of the data stream, wherein each of the N reference levels corresponds to one of N legal codes;

a reference level adjusting device, for adjusting the N reference levels, and outputting the N adjusted reference levels;

a reference level setup device, outputting N reference levels which each has a respective setup value; and a reference level selecting device, for receiving the output of the reference level setup device and the output of the reference level adjusting device, and alternatively outputting the output of the reference level setup device or the output of the reference level adjusting device to the Viterbi decoder.

* * * * *